United States Patent [19]

Ishii et al.

[11] 4,292,544
[45] Sep. 29, 1981

[54] POWER CONTROL CIRCUIT

[75] Inventors: Masanori Ishii, Kawagoi; Kazuo Kameya, Tsurugashima, both of Japan

[73] Assignee: Toko, Inc., Tokyo, Japan

[21] Appl. No.: 961,441

[22] Filed: Nov. 16, 1978

[30] Foreign Application Priority Data

Nov. 18, 1977 [JP] Japan .................. 52/138760

[51] Int. Cl.³ .......................... H02M 3/10; H02J 1/10
[52] U.S. Cl. ............................... 307/52; 363/16; 323/345
[58] Field of Search ............ 307/43, 17, 52–63, 307/106, 107, 115, 1, 5, 7, 87, 132, 104, 134; 363/131, 132, 16, 17; 323/DIG. 1, 23–25

[56] References Cited

U.S. PATENT DOCUMENTS

| | | | |
|---|---|---|---|
| 2,872,582 | 2/1959 | Norton | 363/131 X |
| 3,030,590 | 4/1962 | Fougere et al. | 363/131 X |
| 3,074,031 | 1/1963 | Hoge | 307/17 X |
| 3,284,696 | 11/1966 | Nagata et al. | 307/17 X |
| 3,832,623 | 8/1974 | Boyden et al. | 363/131 |

*Primary Examiner*—L. T. Hix
*Assistant Examiner*—W. J. Brady

*Attorney, Agent, or Firm*—Schwartz, Jeffery, Schwaab, Mack, Blumenthal & Koch

[57] ABSTRACT

A power control circuit is disclosed which may comprise a transformer having a primary winding and at least one secondary winding, a first and a second series circuit, and a rectifier circuit. The first series circuit may include a first DC power source, a first transistor and the primary winding of the transformer. The second series circuit may include the primary winding of the transformer, an excitation coil arranged to flow through the primary winding of the transformer a current which increases with time, a second DC power source and a second transistor. The rectifier circuit may be connected with the secondary winding of the transformer. In this power control circuit, an excitation current is first caused to flow through the primary winding of the transformer so that energy is stored therein. Thereafter, a current opposite to the excitation current is caused to flow through the primary winding of the transformer, and a current induced from the current flowing from the secondary winding to the primary winding of the transformer and a current resulting from the energy stored in the primary winding of the transformer are superimposed upon each other in the secondary winding of the transformer. Finally, a current resulting from the superimposition is rectified by the rectifier circuit, so that a continuous output is provided.

5 Claims, 9 Drawing Figures

POWER CONTROL CIRCUIT

This invention relates to a power control circuit. It is an object of the present invention to provide a power control circuit based on an entirely new concept, which has an enhanced efficiency of controlled output power available from the output side to the input power supplied from a power source, or an improved power conversion efficiency, is capable of providing an output stabilized against fluctuations in the power source and load, is quick in response, is of light weight and is highly reliable. As will be appreciated from the following description, the present invention is most effectively usable with a wide variety of applications such for example as various power amplifiers, DC-AC power converters, stabilized DC power sources, stabilized AC power sources and so forth.

According to an aspect of the present invention, there is provided a power control circuit comprising a transformer having a primary winding and at least one secondary winding; a first series circuit including a first DC power source, a first transistor and the primary winding of the transformer; a second series circuit including the primary winding, an excitation coil arranged to flow through the primary winding a current which increases with time, a second DC power source and a second transistor; and a rectifier circuit connected with the secondary winding of the transformer, wherein an excitation current is first caused to flow through the primary winding of the transformer so that energy is stored therein; thereafter, a current opposite to the excitation current is caused to flow through the primary winding; a current induced from the current flowing from the secondary winding to the primary winding of the transformer and a current resulting from the stored energy are superimposed upon each other in the secondary winding of the transformer; and a current resulting from the superimposition is rectified by the rectifier circuit so that an output is provided.

Other objects, features and advantages of the present invention will become apparent from the following description taken in conjunction with the accompanying drawings.

Figure 1:
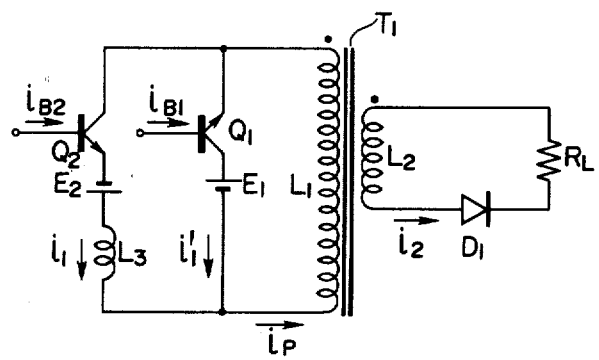
FIG. 1 is a diagram showing a basic circuit arrangement according to the present invention.

With reference to the drawings, the basic concept of the present invention will be described below. Referring first to FIG. 1, there is shown a basic circuit according to the present invention, which includes a transformer $T_1$ comprising a primary winding $L_1$ and a secondary winding $L_2$; a first series circuit including a DC power source $E_1$, a transistor $Q_1$ and the primary winding $L_1$ of the transformer $T_1$; and a second series circuit including a DC power source $E_2$, a transistor $Q_2$, the primary winding $L_1$ of the transformer $T_1$ an excitation coil $L_3$. The transformer $T_1$ has the secondary winding $L_2$ connected to a load $R_L$ through a diode $D_1$.

Figure 2:
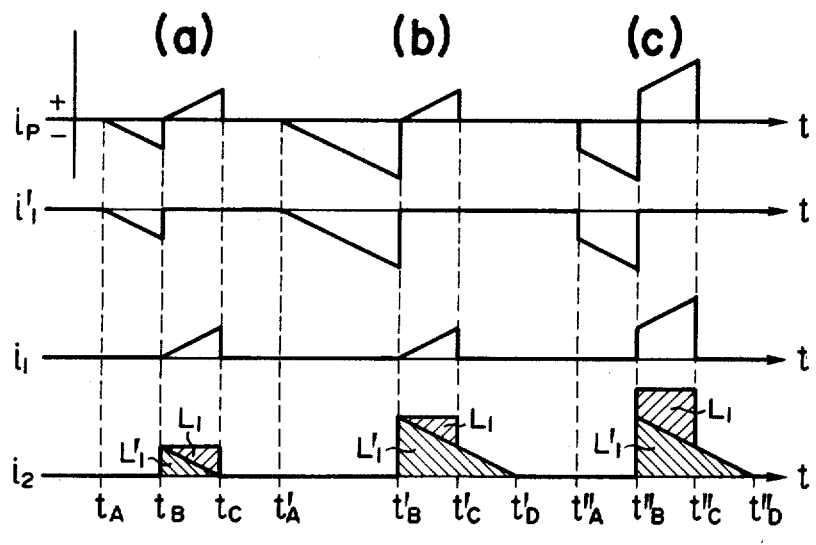
FIG. 2 is a view illustrating various waveforms which occur in the circuit shown in FIG. 1.

Waveforms which occur at various points in the circuit of FIG. 1 are shown at (a), (b) and (c) in FIG. 2. Description will now be made of the operation of the circuit shown in FIG. 1.

Referring to FIG. 2(a), a base current $i_{B1}$ is supplied to the transistor $Q_1$ at a point of time $t_A$, whereby the transistor $Q_1$ is turned on so that an excitation current $i_1'$ is passed through the primary winding $L_1$ of the transformer $T_1$. As a result, a voltage is induced across the secondary winding $L_2$ of the transformer $T_1$, but no secondary current $i_2$ is permitted to flow due to the fact that the induced voltage is of reverse polarity with respect to the diode $D_1$. The excitation current $i_1'$ increases with time from zero in the negative direction, so that the magnetic flux $\phi$ which occurs in the core of the transformer $T_1$ is increased.

At a point of time $t_B$, the base current $i_{B1}$ of the transistor $Q_1$ is interrupted so that this transistor is turned off. At the same time, a base current $i_{B2}$ is supplied to the transistor $Q_2$ so that this transistor is turned on. Thus, the excitation current $i_1'$ flowing through the primary winding $L_1$ of the transformer $T_1$ is interrupted to be zero, while the primary current $i_1$ is permitted to flow therethrough. The primary current $i_1$ increases with time from zero due to the fact that the excitation coil $L_3$ is inductive. In this way, the energy stored in the transformer $T_1$ for the time $t_A$-$t_B$ results in a flyback voltage being generated in the secondary winding $L_2$ at the point of time $t_B$, whereby a secondary current $i_2$ is caused to flow so that the magnetic flux $\phi$ occurring in the core of the transformer $T_1$ becomes continuous.

At a point of time $t_C$, the transistor $Q_2$ is turned off so that the primary current $i_1$ is interrupted to be zero. Referring to FIG. 2, there is shown a state that the energy in the transformer is zero. Energy is stored in the excitation coil $L_3$ by the primary current $i_1$.

During the time $t_B$-$t_C$, the aforementioned secondary current $i_2$ decreases with time, as indicated by a hatched portion $L_1'$ in FIG. 2(a). As the induced voltage occurring in the secondary winding $L_2$ is of forward polarity with respect to the diode $D_1$, the secondary current $i_2$ increases with time from zero as indicated by the hatched portion $L_1$ in FIG. 2(a). Thus, the secondary current $i_2$ flowing for the time $t_B$-$t_C$ is caused to have a flat waveform which results from superimposition of the hatched portions $L_1'$ and $L_1$ shown in FIG. 2(a).

For the convenience of explanation, it is assumed in FIG. 2(b) that there once again occurs the initial condition that no energy is stored in the transformer $T_1$ or excitation coil $L_3$. At a point of time $t_A'$, the transistor $Q_1$ is turned on so that an excitation current $i_1'$ is caused to flow through the primary winding $L_1$ of the transformer $T_1$ in such a manner as to increase with time from zero in the negative direction. At a point of time $t_B'$, the transistor $Q_1$ is turned off while the transistor $Q_2$ is turned on, whereupon the aforementioned excitation current $i_1'$ is interrupted to be zero while the primary current $i_1$ increases with time from zero as was the case with FIG. 2(a). By making the time $t_A'$-$t_B'$ longer than the time $t_A$-$t_B$ shown in FIG. 2(a), a current which is higher than that which flowed at the point of time $t_B$ in FIG. 2(a) is caused to flow through the primary winding $L_1$ at the point of time $t_B'$, so that the energy stored in the transformer $T_1$ is increased and the magnetic flux $\phi$ occurring in the core of the transformer $T_1$ is also increased. Furthermore, the secondary current $i_2$ is caused to flow through the secondary winding $L_2$ so that the aforementioned magnetic flux $\phi$ becomes continuous. By rendering the transistor $Q_2$ non-conductive at a point of time $t_C'$, the primary current $i_1$ is made to be zero. During the time $t_B'$-$t_D'$, the secondary current $i_2$ induced by the excitation current $i_1'$ decreases with time as indicated by a hatched portion $L_1'$ in FIG. 2(b). The secondary current $i_2$ resulting from the primary current $i_1$ increases with time as indicated by a hatched portion $L_1$ in FIG. 2(b), but at a point of time $t_C'$, this secondary current becomes nil. However, during the time $t_C'$-$t_D'$, energy remains stored in the transformer $T_1$ so that the secondary current $i_2$ induced by the excitation current $i_1'$ decreases with time down to zero as is seen from the hatched portion $L_1'$ in FIG. 2(b).

In this way, the secondary current $i_2$ which flows during the time $t_B'$-$t_C'$ can be made to have a flat waveform which results from superimposition of the hatched portions $L_1'$ and $L_1$ in FIG. 2(b). And the secondary current $i_2$ rises up with a higher value at the point of time $t_B'$ than at the point of time $t_B$.

At the point of time $t_C'$, the energy stored in the transformer $T_1$ is still present; thus, by making the design such that the transformer $Q_1$ is again turned on concurrently with turning-off of the transistor $Q_2$, it is possible to produce an operational current waveform such as occurs during the time $t_B''$-$t_D''$ in FIG. 2(c).

At a point of time $t_A''$, the excitation current $i_1'$ rises up with a value higher than zero and increases with time in the negative direction so that the negative residual flow $\phi$ occurring in the core of the transformer $T_1$ becomes continuous. Thus, by making the time $t_A''$-$t_B''$ substantially equal to the time $t_A$-$t_B$ in FIG. 2(a), and by making the design such that the transistor $Q_2$ is turned on concurrently with turning-off of the transistor $Q_1$, the excitation current $i_1'$ is made to be zero after having reached a value lower than the current value at the point of time $t_b$.

If energy remains in the excitation coil $L_3$ at the point of time $t_B''$, then the primary current is caused to rise up not from zero but from a value higher than zero and thus increases with time. Consequently, during the time $t_B''$-$t_C''$, the secondary current $i_2$ also rises up with a value higher than zero as indicated by a hatched portion $L_1$ in FIG. 2(c), and increases with time. At the point of time $t_C''$, the transistor $Q_2$ is turned off so that the primary current $i_1$ is made to be zero, and the hatched portion $L_1$ in FIG. 2(c) is also made to be zero.

For the time $t_C''$-$t_D''$, energy remains stored in the transformer $T_1$; thus, the secondary current $i_2$ such as indicated by a hatched portion $L_1'$ in FIG. 2(c) is permitted to flow which decreases with time down to zero. In this way, the secondary current $i_2$ which flows during the time $t_B''$-$t_C''$ can be made to have a flat waveform resulting from superimposition of the hatched portions $L_1'$ and $L_1$ in FIG. 2(c). And the secondary current $i_2$ rises up with a higher value than that at the point of time $t_B'$ in FIG. 2(b).

As will be appreciated from the foregoing description, the secondary current $i_2$ available from the secondary winding $L_2$ of the transformer $T_1$ via the diode $D_1$ is proportional to the sum of the current resulting from the energy stored in the transformer $T_1$ and the rise-up current flowing through the primary winding $L_1$ of the transformer $T_1$. Thus, by controlling the energy stored in the transformer $T_1$ and the residual energy in the excitation coil $L_3$, it is possible to control the aforementioned secondary current $i_2$.

In this way, according to the present invention, the secondary current $i_2$ can be taken out with a waveform which is flat with respect to time and with a controlled value. It is required that the energy stored in the transformer $T_1$ be such that the magnetic flux $\phi$ occurring in the core of the transformer $T_1$ is lower than the saturation magnetic flux density. However, by virtue of the fact that the rise-up version of the primary current $i_1$ is added to the current resulting from the energy stored in the transformer $T_1$, the secondary current $i_2$ can be taken out as one which has higher energy than that obtained immediately before the saturation magnetic flux density is reached.

Figure 3:
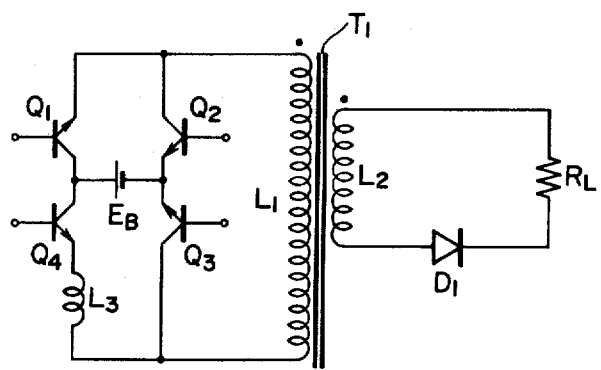
FIG. 3 is a diagram showing another basic circuit arrangement according to the present invention.

Though the basic circuit shown in FIG. 1 includes two DC power sources and two transistors, it is also possible to achieve operation similar to that illustrated in FIG. 2, by employing a single DC power source and four transistors as in the circuit shown in FIG. 3.

The arrangement of FIG. 3 comprises a first series circuit including a DC power source $E_B$, a first transistor $Q_1$, the primary winding $L_1$ of transformer $T_1$ and a third transistor $Q_3$, and a second series circuit including the DC power source $E_B$, a second transistor $Q_2$, the primary winding $L_1$ of the transformer $T_1$, an excitation coil $L_3$ and a fourth transistor $Q_4$, with the secondary winding $L_2$ of the transformer $T_1$ being coupled to a load $R_L$ through a diode $D_1$.

With the arrangement mentioned above, the transistors $Q_1$ and $Q_3$ are turned on at the same time while the transistors $Q_2$ and $Q_4$ are turned off at the same time, so that a current is permitted to flow which corresponds to the excitation current $i_1'$ shown in FIG. 1; and thereafter the transistors $Q_2$ and $Q_4$ are turned on at the same time while the transistors $Q_1$ and $Q_3$ are turned off at the same time, so that a current is permitted to flow which corresponds to the primary current $i_1$ shown in FIG. 1. In this way, the circuit of FIG. 3 can operate in a manner similar to that described above in connection with FIG. 2.

By providing a polarity reversing circuit comprising a single DC power source and four transistors, there can be provided a power control circuit similar to that shown in FIG. 1. Such a circuit arrangement is advantageous in that only one power source is needed.

Figure 4:
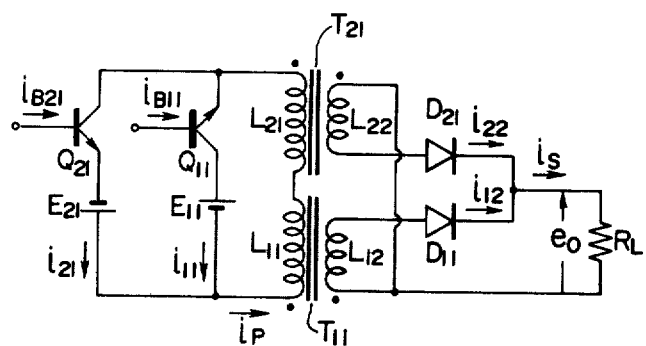
FIG. 4 is a circuit diagram showing an embodiment of the present invention.

Referring now to FIG. 4, there is shown an embodiment of the present invention, which will be described in detail below.

The circuit arrangement shown in FIG. 4 includes a transformer $T_{11}$ comprising a primary winding $L_{11}$ and a secondary winding $L_{12}$; a second transformer $T_{21}$ comprising a primary winding $L_{21}$ and secondary winding $L_{22}$; DC power sources $E_{11}$ and $E_{21}$; transistors $Q_{11}$ and $Q_{21}$; diodes $D_{11}$ and $D_{21}$; and a load $R_L$.

In the circuit arrangement of FIG. 4, there are provided two series circuits: one including the DC power source $E_{11}$, transistor $Q_{11}$, the primary winding $L_{21}$ of the transformer $T_{21}$ and the primary winding $L_{11}$ of the transformer $T_{11}$, and the other including the DC power source $E_{21}$, transistor $Q_{21}$, the primary winding $L_{21}$ of the transformer $T_{21}$ and the primary winding $L_{11}$ of the transformer $T_{11}$. The secondary windings $L_{12}$ and $L_{22}$ of the two transformers are connected in parallel with each other so that rectified outputs of the same polarity can be obtained from these secondary windings $L_{12}$ and $L_{22}$ through the diodes $D_{11}$ and $D_{21}$ respectively, by alternately turning on and off the transistors $Q_{11}$ and $Q_{21}$. Generically, according to the embodiment shown in FIG. 4, there is provided a power control circuit which comprises a first and a second transformer each having a primary winding and at least one secondary winding; a first series circuit including a first DC power source, a first transistor and the primary windings of the first and second transformers; a second series circuit including a second DC power source, a second transistor and the primary windings of the first and second transformers; and rectifier circuits connected in parallel with each other so that rectified outputs available from the secondary windings of the first and second transformers respectively are of the same polarity, wherein the first and second transistors are alternately turned on and off so that negative and positive currents are caused to flow through the primary windings of the two transformers; after energy has been stored in the primary winding of one of the transformers, a current which increases with time is caused to alternately flow through the respective primary windings; a current induced from the current flowing from each of the secondary windings to one of the primary windings is superimposed upon a current which results from energy stored in the other primary winding; and the current resulting from the superimposition is rectified by the aforementioned rectifier circuits so that there is provided a continuous output.

Figure 5:
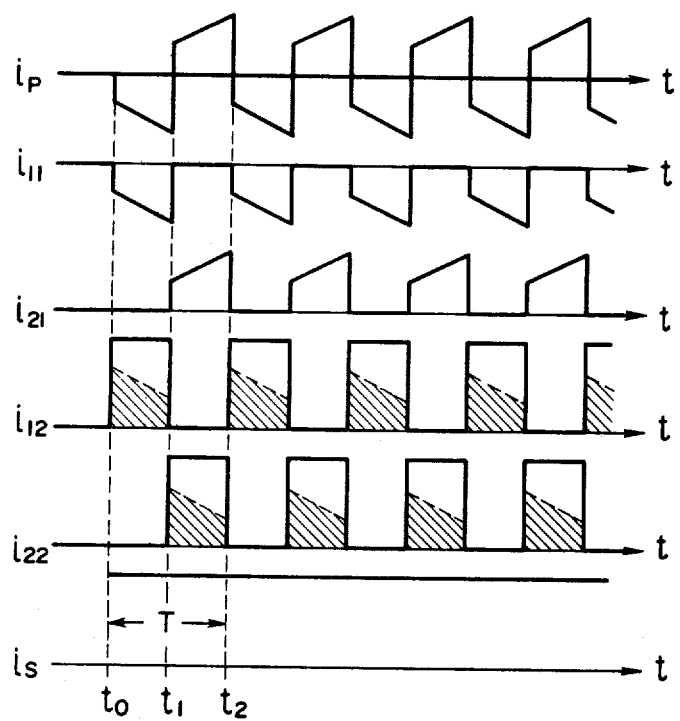
FIG. 5 is a view illustrating various waveforms which occur in the circuit of FIG. 4 when the circuit is in a steady state.

Operational current waveforms occurring at various points in the circuit shown in FIG. 4 are illustrated in FIG. 5.

At a point of time $t_0$, a base current $i_{B11}$ is supplied to the transistor $Q_{11}$ so that this transistor $Q_{11}$ is turned on, while at the same time the base current $i_{B21}$ of the transistor $Q_{21}$ is interrupted so that the transistor $Q_{21}$ is turned off. Assuming that energy remains stored in the transformer $T_{21}$, the primary current $i_{11}$ is caused to rise up with a predetermined negative value and increases with time in the negative direction. Furthermore, assuming that a predetermined quantity of energy is stored in the transformer $T_{11}$, a secondary current $i_{12}$ which is caused to flow from the secondary winding $L_{12}$ of the transformer $T_{11}$ is combined with a current resulting from the voltage induced from the primary winding so that the secondary current $i_{12}$ is caused to have a flat waveform as shown in FIG. 5 in which each hatched portion indicates the energy stored in the transformer $T_{11}$.

At a point of time $t_1$, energy remains stored in the transformer $T_{11}$. At this point, the base current $i_{B11}$ of the transistor $Q_{11}$ is interrupted so that the transistor $Q_{11}$ is turned off, while at the same time a base current $i_{B21}$ is supplied to the transistor $Q_{21}$ so that the latter is turned on, as a result of which the primary current $i_{11}$ is made to be zero, so that the secondary current $i_{12}$ also becomes zero. The primary current $i_{21}$ rises up with a predetermined value and increases with time so that the magnetic flux $\phi$ occurring in the core of the transformer $T_{11}$ becomes continuous. Since energy resulting from the primary current $i_{11}$ is stored in the other transformer $T_{21}$, the secondary current $i_{22}$ which flows from the secondary winding $L_{22}$ of the other transformer $T_{21}$ through the diode $D_{21}$ is combined with a current resulting from the voltage induced from the primary winding $L_{21}$, as a result of which the secondary current $i_{22}$ is caused to have a flat waveform as shown in FIG. 4, in which each hatched portion indicates the energy stored in the other transformer $T_{21}$. In this way, a current $i_S$ which results from the combination of the aforementioned secondary currents $i_{12}$ and $i_{22}$ is applied to the load $R_L$ *as a continuous DC current.*

At the point of time $t_2$, energy remains stored in the transformer $T_{11}$; thus, by interrupting the base current $i_{B21}$ of the transistor $Q_{21}$ to turn off this transistor while at the same time supplying a base current $i_{B11}$ to the transistor $Q_{11}$ to turn on this transistor, the primary current $i_{21}$ is made to be zero so that the secondary current $i_{22}$ is also made to be zero.

Through repetition of the aforementioned operation with the time $t_0$–$t_2$ as one cyclic period T, continuous DC current $i_S$ can be supplied to the load $R_L$, thus resulting in a flat DC voltage $e_O$. In this case, composite primary currents $i_p$ flowing from the DC power sources $E_{11}$ and $E_{21}$ appear as positive-going and negative-going waves, as shown in FIG. 5.

In the foregoing explanation, description has been made of the case where the inductance of the primary winding $L_{11}$ of the transformer $T_{11}$ is equal to the inductance of the primary winding $L_{21}$ of the transformer $T_{21}$ and the circuit operation is in a steady state. Description will now be made of the case where the circuit operation is in a transient state.

The circuit operation will be described below with reference to FIG. 6 which shows the operating current and voltage waveforms occurring at the various points in the circuit of FIG. 4.

At a point of time $t_{10}$, no energy is stored in the transformer $T_{11}$ or $T_{12}$; thus, by supplying base current $i_{B11}$ to the transistor $Q_{11}$ to render this transistor conductive, the primary current $i_{11}$ is increased from zero and the composite current $i_S$ is also increased from zero, so that the output voltage $e_O$ available across the terminals of the load $R_L$ is also increased from zero. In this way, energy is progressively stored in the transformer $T_{21}$, but excitation current is also caused to flow through the primary winding $L_{11}$ so that reverse energy which cannot be taken at the load $R_L$ is stored therein. This is because no energy is as yet stored in the transformer $T_{11}$ and therefore the excitation current flowing through the primary winding $L_{11}$ cannot be cancelled. However, energy stored in the transformer $T_{11}$ is much less than that stored in the transformer $T_{21}$, since the output voltage $e_O$ is still very low and hence the voltage applied to the primary winding $L_{11}$ is also still very low so that the voltage from the DC power source $E_{11}$ is mostly applied to the primary winding $L_{21}$.

At a point of time $t_{11}$, the base current $i_{B11}$ of the transistor $Q_{11}$ is interrupted so that this transistor $Q_{11}$ is turned off, and at the same time, a base current $i_{B21}$ is supplied to the transistor $Q_{21}$ so that the latter transistor $Q_{21}$ is turned on. The energy stored in the primary winding $L_{21}$ is dissipated as secondary current $i_{22}$, but as the reverse energy which cannot be taken at the load $R_L$ is stored in the primary winding $L_{11}$, a reverse voltage is induced in the primary winding $L_{11}$, whereby the primary current $i_{21}$ is prevented from flowing through the transistor $Q_{21}$. At the point of time $t_{11}$, the transistor $Q_{21}$ is in such a state that this transistor is ready to be turned on, but no collector current is permitted to flow therethrough.

At a point of time $t_{12}$, energy is stored in the transformer $T_{11}$ and energy remains stored in the other transformer $T_{21}$; thus, by again turning on the transistor $Q_{11}$ while at the same time turning off the transistor $Q_{21}$, the primary current $i_{11}$ is caused to rise up with a high value so that the output voltage $e_O$ further builds up.

Assuming that the windings of the transformers $T_{11}$ and $T_{21}$ have an equal number of turns, the output voltage $e_O$ which is obtained by alternately turning on and off the transistors $Q_{11}$ and $Q_{21}$ with time $t_{10}-t_{12}$ as one cyclic period T is given as follows:

$$e_O = \frac{E_B}{2\gamma}(1 - e^{-\alpha t}) \quad (1)$$

where $E_B =$ $$|E_{11}| = |E_{21}|, \gamma = \sqrt{\frac{L_{11}}{L_{12}}} = \sqrt{\frac{L_{21}}{L_{22}}}, \alpha = \frac{2\gamma^2 R_L}{L_{21}}$$

As is seen from the above equation (1), the output voltage $e_O$ exponentially continuously builds up irrespective of the cyclic period T. The primary composite current $i_p$ takes a pulsating saw-tooth waveform consisting of alternate positive-going and negative-going portions, and the cyclic period of such saw-tooth waveform depends on the aforementioned cyclic period; thus, the shorter the cyclic period T, the lower becomes the amplitude of the saw-tooth waveform.

Figure 6:
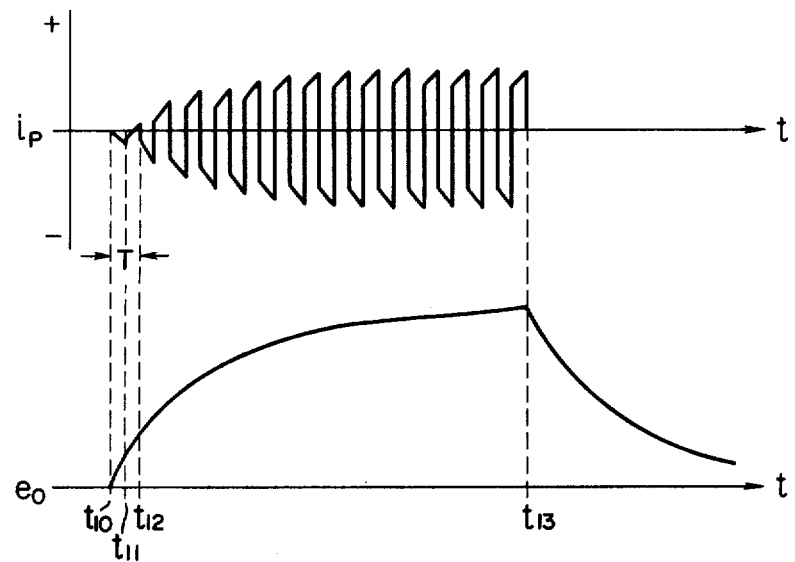
FIG. 6 is a view illustrating various waveforms which occur in the circuit of FIG. 4 when the circuit is in a transient state.

As is seen from the operating current and voltage waveforms shown in FIG. 6, the primary current $i_{11}$ of the transistor $Q_{11}$ and the primary current $i_{12}$ of the transistor $Q_{21}$ differ from each other in respect of amplitude, but the cyclic period of the saw-tooth waveform is equal to the cyclic period with which the transistors $Q_{11}$ and $Q_{21}$ are turned on and off. This is because the residual energy in the transformers $T_{11}$ and $T_{21}$ is non-uniform. By adjusting the timing for turning-on and off of the transistors $Q_{11}$ and $Q_{21}$, the amplitudes of the primary currents $i_{11}$ and $i_{21}$ are equalized as is the case with the waveform $i_p$ shown in FIG. 5. Thus, the cyclic period of the saw-tooth waveform can be made as short as T/2. Furthermore, as is apparent from the above equation (1), the output voltage $e_O$ reaches $E_B/2\gamma$, where $E_B = |E_1| = |E_2|$, so that a steady state or a steady-state value is realized, but the lower the transient value of the output voltage $e_O$ relative to the steady-state value of the output voltage $e_O$, the more sharply rises up the saw-tooth waveform. At a point of time $t_{13}$, the transistors $Q_{11}$ and $Q_{21}$ are rendered non-conductive at the same time, so that energy flowing out of the transformers $T_{11}$ and $T_{21}$ results in the secondary current $i_{12}$ and $i_{22}$ flowing simultaneously; as a result, the output voltage $e_O$ is given as follows:

$$e_O = e_O(O) \cdot e^{-\alpha t} \quad (2)$$

where $e_O(O)$ indicates the amplitude of the output voltage $e_O$ when the transistors $Q_{11}$ and $Q_{21}$ are turned off at the same and which exponentially continuously decreases. The output voltage is continuous even when it is changed from increasing to decreasing.

Through the operation illustrated by the operating waveforms in FIG. 6, the circuit of FIG. 4 is enabled to function as a DC-DC converter which is arranged to convert input voltages provided by the DC power sources $E_{11}$ and $E_{21}$ into different DC voltages. Furthermore, by suitably selecting the circuit constants, it is possible to determine the rise and fall time constants of the output voltage $e_O$ as desired. Still furthermore, according to the present invention, it is possible to obtain an output voltage $e_O$ which is continuous and ripple-free.

Figure 7:
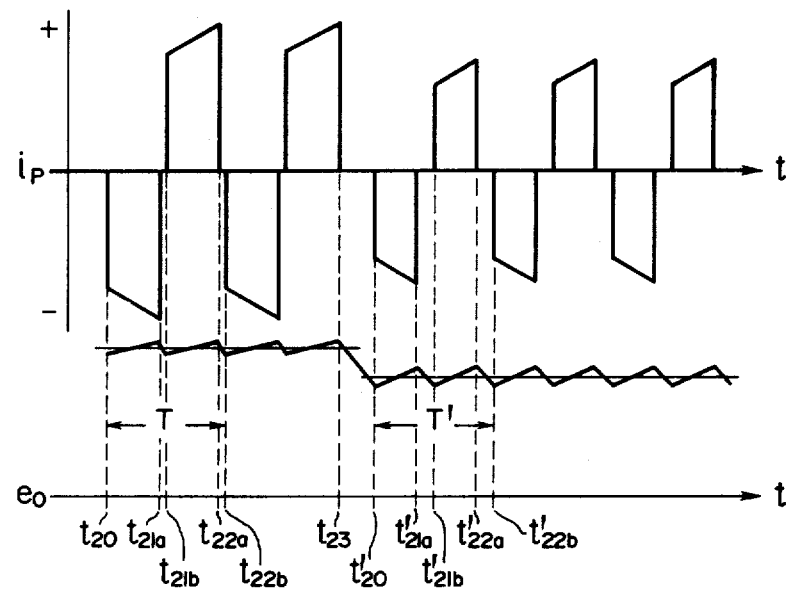
FIGS. 7 and 8 are views useful for explaining the operation of an applied form of the circuit shown in FIG. 4.

Other waveforms which occur in the circuit of FIG. 4 are shown in FIG. 7, and description will now be made of means for controlling the output voltage $e_O$.

In FIG. 7, $t_{20}$ denotes a point of time slightly prior to the point of time when the output voltage $e_O$ reaches a steady-state value. At the point of time $t_{20}$, the transistor $Q_{11}$ is turned on, while at the same time the transistor $Q_{21}$ is turned off; thus, the output voltage $e_O$ builds up with time so as to finally reach the steady-state value. At a point of time $t_{21a}$, the transistors $Q_{11}$ and $Q_{21}$ are turned off at the same time, and as a result, the output voltage $e_O$ begins decreasing. At a point of time $t_{21b}$ when the output voltage $e_O$ assumes the same value as that at the point of time $t_{20}$, the transistor $Q_{21}$ is turned on while at the same time the transistor $Q_{11}$ is turned off; thus, the output voltage $e_O$ builds up again. Further, at a point of time $t_{22a}$ when the output voltage $e_O$ assumes the same value as that at the point of time $t_{21a}$, the transistors $Q_{11}$ and $Q_{21}$ are turned off at the same time, and as a result, the output voltage $e_O$ again beings decreasing. At a point of time $t_{22b}$ when the output voltage assumes the same value as that at the point of time $t_{20}$, again, the transistor $Q_{11}$ is turned on while at the same time the transistor $Q_{21}$ is turned off. Thus, the output voltage $e_O$ builds up again.

Repetition of the foregoing operation with the time $t_{20}-t_{22b}$ as one cyclic period T results in the output voltage $e_O$ having small triangular ripples and being maintained at a value lower than the steady-state value.

At a point of time $t_{23}$, the transistors $Q_{11}$ and $Q_{21}$ are both turned off, and operated for a time longer than the aforementioned time $t_{21a}-t_{21b}$; thus, the output voltage $e_O$ decreases to be lower than the value at the point of time $t_{20}$. At a point of time $t_{20}'$, again, the transistor $Q_{11}$ is turned on while at the same time the transistor $Q_{21}$ is turned off, and as a result, the output voltage $e_O$ builds up. At a point of time $t_{21a}'$ when the output voltage $e_O$ has built up a little, the transistors $Q_{11}$ and $Q_{21}$ are both turned off, and as a result the output voltage $e_O$ begins decreasing. At a point of time $t_{21b}'$ when the output voltage $e_O$ assumes a value equal to that at the point of time $t_{20}'$, the transistor $Q_{21}$ is turned on while at the same time the transistor $Q_{11}$ is turned off, and thus the output voltage $e_O$ again begins increasing. Further, at a point of time $t_{22a}'$ when the output voltage $e_O$ has a value equal to that at the point of time $t_{21a}'$, the transistors $Q_{11}$ and $Q_{21}$ are both turned off, and thus the output voltage $e_O$ decreases. At a point of time $t_{22b}'$ when the output voltage $e_O$ assumes a value equal to that the point of time $t_{20}'$, the transistor $Q_{11}$ is turned on while at the same time the transistor $Q_{21}$ is turned off, and thus the output voltage $e_O$ builds up.

In this way, repetition of the operation mentioned just above with the time $t_{20}'-t_{22b}'$ as one cyclic period T results in the output voltage $e_O$ having small triangular ripples and being maintained at a value lower than that during the aforementioned time $t_{20}-t_{23}$.

The current $i_p$ available from the DC power sources $E_{11}$ and $E_{21}$ rises up with a negative value at the point of time $t_{20}$; it increases with time in the negative direction; it reaches a negative maximum value at the point of time $t_{21a}$; and thereafter it becomes zero. At the point of time $t_{21b}$, the current $i_p$ rises up with a positive value which is equal in absolute value to the value at the point of time $t_{20}$; it increases with time; it reaches a positive maximum value which is equal in absolute value to the value at the point of time $t_{21a}$; and thereafter it becomes zero. At the point of time $t_{22b}$, the current $i_p$ rises up with a negative value which is equal in absolute value to the value at the point of time $t_{20}$, and it increases with time.

Through repetition of the foregoing operation, the current $i_p$ from the DC power sources $E_{11}$ and $E_{21}$ reaches, at the point of time $t_{23}$, a positive maximum value which is equal in absolute value to the value at the point of time $t_{22a}$; and thereafter it becomes zero.

At the point of time $t_{20}'$, the current $i_p$ rises up with a negative value which is lower in absolute value than the value at the point of time $t_{20}$; it increases with time; at the point of time $t_{21a}'$, it reaches a negative maximum value which is lower in absolute value than the value at the point of time $t_{21a}$; and thereafter it becomes zero. At the point of time $t_{21b}'$, the current $i_p$ rises up with a negative value which is equal in absolute value to the value at the point of time $t_{20}'$; it increases with time in the negative direction; at the point of time $t_{22a}'$, it reaches a negative maximum value which is equal in absolute value to the value at the point of time $t_{21a}'$; and thereafter it becomes zero. At the point of time $t_{22b}'$, the current $i_p$ rises up with a negative value which is equal in absolute value to the value at the point of time $t_{20}'$, and it increases with time in the negative direction.

Thus, repetition of the foregoing operation results in the current $i_p$ from the DC power sources $E_{11}$ and $E_{21}$ having such a waveform as shown in FIG. 6.

As will be seen from FIG. 7, during the time when the output voltage $e_O$ is high, the current $i_p$ from the DC power sources $E_{11}$ and $E_{21}$ rises up with a high value, and the ratio of the period of time during which the current $i_p$ is flowing to the period of time during which the current $i_p$ is interrupted, is low. During the time when the output voltage $e_O$ is low, the current $i_p$ rises up with a lower value than that with which it rises up during the time when the output voltage $e_O$ is higher, and the ratio of the period of time during which the current $i_p$ is flowing to the period of time during which the current $i_p$ is interrupted, is high. Thus, the output voltage $e_O$ is continuous despite the discontinuity of the current $i_p$ from the DC power source $E_{11}$ and $E_{21}$.

As will be appreciated from the above explanation, it is possible to maintain the output voltage $e_O$ at any desired value lower than the steady-state value by inserting the time when the transistors $Q_{11}$ and $Q_{21}$ are both rendered non-conductive between the times when the transistors $Q_{11}$ and $Q_{21}$ are alternately rendered conductive and non-conductive, and by changing the ratio of the period of time during which one of the transistors $Q_{11}$ and $Q_{21}$ is conducting to the period of time during which the transistors $Q_{11}$ and $Q_{21}$ are both non-conducting.

Figure 8:
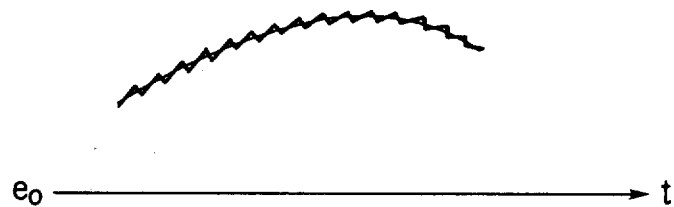

The output voltage $e_O$ can also be changed continuously, and the control response thereof is shown in FIG. 8, from which it will be seen that the output voltage $e_O$ can be approximated by a sequence of triangular waves of a low amplitude. Thus, the circuit according to the present invention is also responsive to a waveform of the output voltage $e_O$ which has lower rise and fall speeds than those shown in FIG. 5.

Figure 9:
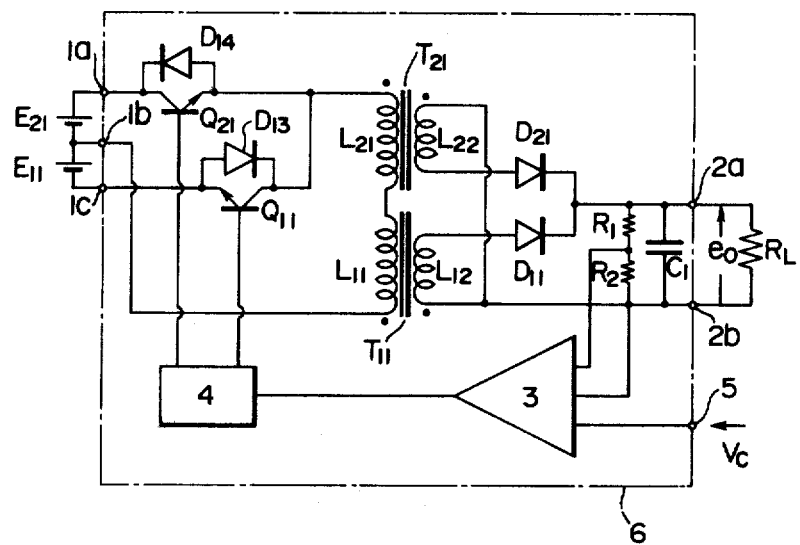
FIG. 9 is a circuit diagram showing a further embodiment of the present invention.

A further embodiment of this invention is shown in FIG. 9, which will now be explained. FIG. 9 is basically similar to FIG. 4, and therefore parts of FIG. 9 corresponding to those of FIG. 4 are indicated by like references.

The circuit of FIG. 9 includes input terminals $1a$, $1b$ and $1c$ connected with DC power sources $E_{11}$ and $E_{21}$, output terminals $2a$ and $2b$, a differential amplifier 3, a base current control circuit 4, input terminal 5 of the differential amplifier 3 to which is applied a control voltage $V_c$, voltage dividing resistors $R_1$ and $R_2$. The present power control circuit is generally shown at 6. Diodes $D_{13}$ and $D_{14}$ connected in parallel with transistors $Q_{11}$ and $Q_{21}$ are provided for the purpose of permitting of reverse current flow, as described in connection with FIG. 6.

Energy stored in the primary winding $L_{11}$ provides a reverse voltage induced therein, and energy stored in the primary winding $L_{21}$ also provides a reverse voltage induced therein. The optimum condition for the circuit operation is such that the sum of the reverse voltages induced in the primary windings $L_{11}$ and $L_{21}$ is equal to the voltage derived from each of the DC power sources $E_{11}$ and $E_{21}$, and such a condition is satisfied in the example of FIG. 8 since the waveform shown therein is clamped by the power source voltage.

In this way, the reverse voltages are retrieved by the DC power sources $E_{11}$ and $E_{21}$ as excess energy without being wasted, through a closed circuit including the DC power source $E_{11}$, diode $D_{13}$ and primary windings $L_{21}$ and $L_{11}$ and through a closed circuit including the diode $D_{14}$, DC power source $E_{21}$ and primary windings $L_{11}$ and $L_{21}$.

The diodes $D_{13}$ and $D_{14}$ also serve to achieve retrieval to the DC power sources $E_{11}$ and $E_{21}$ of spike voltages which tend to be induced in the primary windings due to the leakage inductance between the primary and the secondary winding of each transformer.

With the conventional switching power sources, it has been necessary to separately provide a spike absorbing winding in the transformers in order to make possible retrieval to the DC power source of spike voltages tending to occur when flyback voltage rises up.

In contrast thereto, according to the present invention, the necessity of providing a separate spike-absorbing winding in the transformers is eliminated; spike voltages occurring in the primary windings are clamped by the power source voltage and can be retrieved as excess energy by the DC power sources; the circuit arrangement is simplified; and the transistors $Q_{11}$ and $Q_{21}$ can be prevented from breakage due to over-voltage.

The embodiment shown in FIG. 9 is similar to the embodiment shown in FIG. 4, except that a feedback circuit is additionally provided. According to this embodiment, there is provided a power control circuit wherein a continuous triangular wave voltage obtained across the output terminals $2a$ and $2b$ and the input control voltage $V_c$ are compared in the differential amplifier 3; the times when the transistors $Q_{11}$ and $Q_{21}$ are rendered conductive and non-conductive, are controlled in accordance with the resultant differential output; and thus a homologous rectangular wave voltage proportional to the aforementioned input control voltage $V_c$ is obtained across the load $R_L$.

When a positive control voltage $V_c$ is applied to the input terminals 5, output voltage $e_O$ available between the output terminals $2a$ and $2b$ and the positive control voltage $V_c$ are compared and amplified in the differential amplifier 3; and the resultant differential output is supplied to the base current control circuit 4. This circuit 4 is arranged to control the times when the transistors $Q_{21}$ and $Q_{11}$ are alternately rendered conductive and non-conductive and the times when the transistors $Q_{21}$ and $Q_{11}$ are rendered non-conductive at the same time, so that the output voltage $e_O$ available across the output terminals $2a$ and $2b$ becomes proportional to the positive control voltage $V_c$. In turn, the output voltage $e_O$, which is proportional to the positive control voltage $V_c$, is attenuated to $e_O R_2/(R_1+R_2)$ by the dividing resistors $R_1$ and $R_2$, and then applied to another input terminal of the differential amplifier 3, whereby there is provided negative feedback. Thus, the output voltage $e_O$, which is homologous to the control voltage $V_c$, is given by the following expression:

$$e_O \approx R_1 + R_2/R_1 \cdot V_c \qquad (3)$$

A capacitor $C_1$ may be inserted when it is required that small triangular ripples as well as small spikes tending to occur when switching of the transistors $Q_{11}$ and $Q_{21}$ is effected, be eliminated. The value for this capacitor does not have to be so high.

The circuit arrangement according to the embodiment shown in FIG. 9 can most commonly be employed for a stabilized DC power source device. With this arrangement, it is possible to make the output voltage $e_O$ invariable or variable by employing a reference voltage source which provides an invariable or variable control voltage $V_c$. The stabilized DC power source device embodying the present invention requires no complex smoothing circuit components at the output stage thereof unlike the conventional switching power sources. In the device embodying the present invention, it is only required that capacitor $C_1$ of low capacitance be inserted when needed; thus, a very quick control response, which substantially compares with that of a series-dropper type linear circuit power source, can be achieved, although it depends on the switching speed of the transistors $Q_{11}$ and $Q_{21}$. The current flowing through each portion of the circuit remains substantially unchanged with time, and this facilitates selection of the circuit elements and reduces power loss. Furthermore, as mentioned above, the number of turns of each transformer winding may be small, and yet an output above that achieved at the saturation magnetic flux density can be taken out, so that the core loss is relatively small; thus, the entire loss of the transformer can be reduced. In addition, the transformer per se can be miniaturized and made to be of light weight. Furthermore, since no smoothing circuit is needed as mentioned above, there occurs neither loss due to the presence of a smoothing choke nor loss due to a large current flowing in and out of a smoothing capacitor. In this way, according to the present invention, there is provided a switching power source with a greatly reduced loss and hence with an improved power efficiency.

The circuit according to the present invention is advantageous in that peak values of the currents flowing through the various portions thereof are lower than those in the conventional switching power source devices capable of providing substantially the same amount of power as that which is provided by the present circuit, and in that spike currents can be effectively retrieved by the DC power source so that spike noise can be minimized. Thus, according to the present invention, there is provided a switching power source circuit which is of light weight, of high performance, of high reliability and inexpensive.

Though, in the foregoing explanation, description has been made of the case where each transformer has a single secondary winding, it is also possible that each transformer may include a plurality of secondary windings so that output voltages can be separately taken out in a stabilized form.

In order to isolate, DC-wise, the DC power source and the output circuit from each other, coupling means such for example as photo-coupler may be provided in the amplification and control system of the differential amplifier 3 and base current control circuit 4, and by so doing, it is possible to realize, with ease, an output-input isolated type switching power source circuit.

The present invention is equally applicable where the control voltage $V_c$ is AC, and in such a case, there is obtained an output voltage $e_O$ homologous to the control voltage $V_c$, so that a power control circuit responsive to a wide range of input power from DC to high frequency AC power can be realized.

As will be appreciated from the above description, the present invention finds extensive use in a wide range of applications such as in common power amplifiers, servo-amplifiers, DC-AC power converters, AC-AC power converters, constant AC voltage power sources, stabilized DC voltage sources the output voltage of which can be continuously changed from positive to negative, and so forth.

In the conventional power amplifiers, active elements such as transistors or the like have been used to constitute a linear circuit so that loss inevitably occurs in such elements, whereas in the present invention, such active elements are simply made to perform switching function so that loss tending to occur therein can be minimized. Furthermore, as described above in connection with FIG. 9, the circuit according to the present invention is greatly improved in respect of power conversion efficiency over the conventional power amplifiers. Still furthermore, according to the present invention, there is no need to specially provide a DC power source using a power transformer for power amplifier; rather, according to the present invention, DC power resulting from direct rectification of the commercial line power source can be utilized, and yet the signal output and input terminals can easily be isolated from the commercial line. In this way, according to this invention, there is provided a power amplifier which is inexpensive and of light weight. Thus, by applying the present invention to the aforementioned various applications, it is possible to realize devices which are of high efficiency, of high performance, of light weight, of high reliability and inexpensive.

Although this invention has been described with respect to some specific embodiments, it is to be understood that the invention is not restricted thereto but covers any and all modifications and changes which may be made within the scope of the appended claims.

What is claimed is:

1. A power control circuit comprising a transformer having a primary winding and at least one secondary winding; a first series circuit including a first DC power source, a first transistor and the primary winding of said transformer; a second series circuit including said primary winding, an excitation coil arranged to flow through said primary winding a current which increases with time, a second DC power source and a second transistor; and a rectifier circuit connected with the secondary winding of said transformer, wherein an excitation current is first caused to flow through the primary winding of said transformer so that energy is stored therein; thereafter, a current opposite to said excitation current is caused to flow through said primary winding; a current which is induced in the secondary winding by the current flowing through the primary winding of said transformer and a current resulting from the stored energy are superimposed upon each other in said secondary winding; and a current resulting from the superimposition is rectified by said rectifier circuit so that an output is provided.

2. A power control circuit comprising a transformer having a primary winding and at least one secondary winding; a first series circuit including a DC power source, a first transistor, the primary winding of the transformer and a third transistor; a second series circuit including said DC power source, a second transistor, the primary winding of the transformer, an excitation coil arranged to flow through said primary winding a current which increases with time and a fourth transistor; and a rectifier circuit connected with the secondary winding of the transformer, wherein an excitation current is first caused to flow through the primary winding of the transformer so that energy is stored therein; thereafter, a current opposite to said excitation current is caused to flow through said primary winding; a current which is induced in the secondary winding by the current flowing through the primary winding of the transformer and a current resulting from the stored energy are superimposed upon each other in said secondary winding; and a current resulting from the superimposition is rectified by said rectifier circuit so than an output is provided.

3. A power control circuit comprising a first and a second transformer each having a primary winding and at least one secondary winding; a first DC power source; a first series circuit including a first DC power source, a first transistor and the primary windings of the first and second transformers, a second series circuit including a second DC power source, a second transistor and the primary windings of the first and second transformers; and rectifier circuits connected in parallel with each other so that rectified output available from the secondary windings of the first and second transformers respectively are of the same polarity, wherein the first and second transistors are alternately turned on and off; so that positive and negative currents which increase with time are caused to alternately flow through the primary windings of said two transformers in such a manner that energy is stored in one of the transformers and a current which is induced in the secondary winding of the other transformer by the current flowing through the primary winding of said other transformer, is superimposed upon a current resulting from the energy stored in said other transformer after energy has been stored in the primary winding of one of the transformers, a current which increases with time is caused to alternately flow through the respective primary windings; a current which is induced in each of the secondary windings by the current flowing through one of the primary windings and a current resulting from the energy stored in the other primary winding are superimposed upon each other; and a current resulting from the superimposition is rectified by the rectifier circuits so that a continuous output is provided.

4. A power control circuit according to claim 3, wherein between the times for which a positive and a reverse current are caused to flow through the primary windings of the first and second transformers, a time for which no such current are caused to flow therethrough, is inserted; and the ratio of the period of time during which said two currents are flowing to the period of time during which said two currents are not flowing, is varied, thereby controlling the output voltage.

5. A power control circuit according to claim 3, wherein diodes are connected with the first and second transistors in reverse polarity with respect thereto.

* * * * *